April 8, 1930.  W. G. FUNK  1,754,092
THREAD CUTTER
Filed Nov. 10, 1925    2 Sheets-Sheet 1
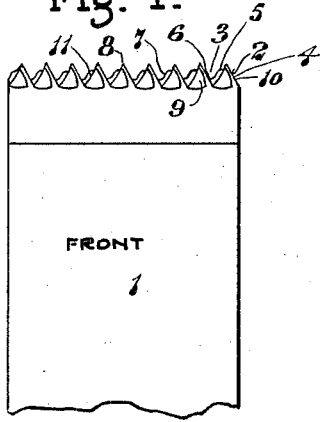
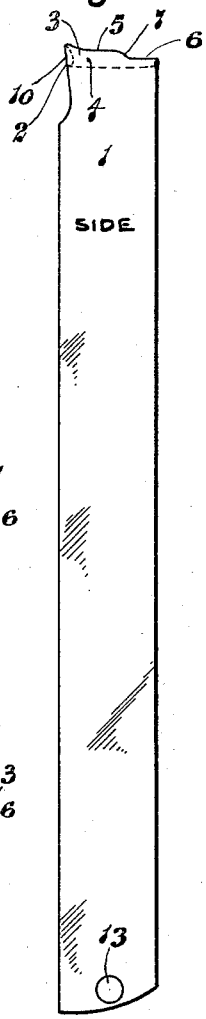
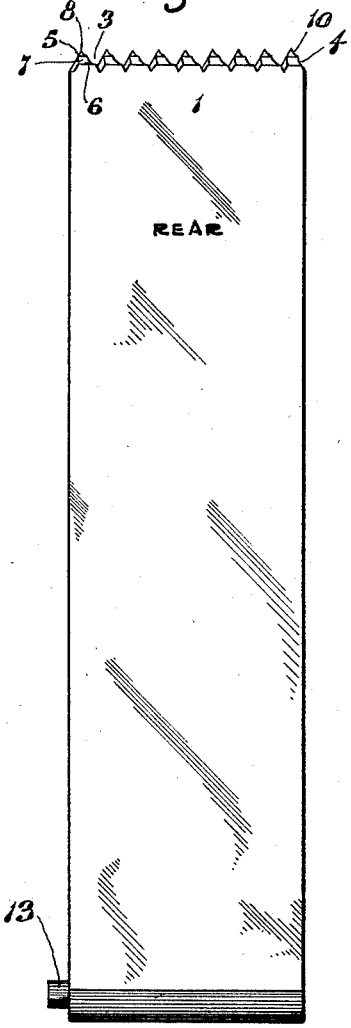
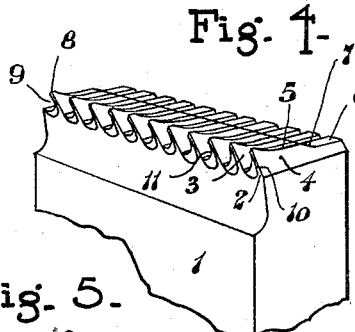
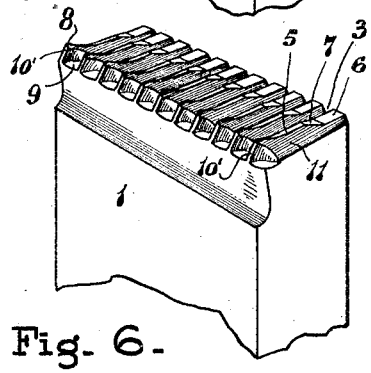
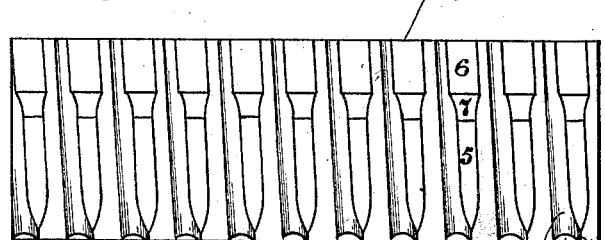
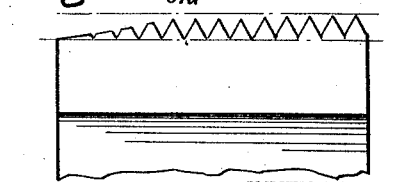
INVENTOR.
William G. Funk
BY
ATTORNEY.

April 8, 1930.                    W. G. FUNK                    1,754,092
                                 THREAD CUTTER
                              Filed Nov. 10, 1925           2 Sheets-Sheet 2
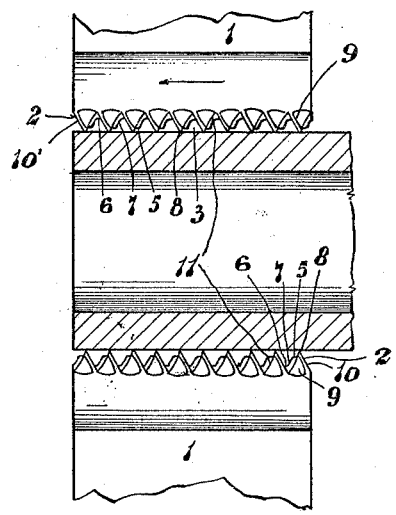
Fig. 8.
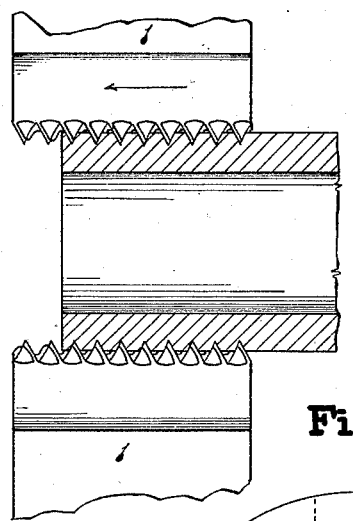
Fig. 9.
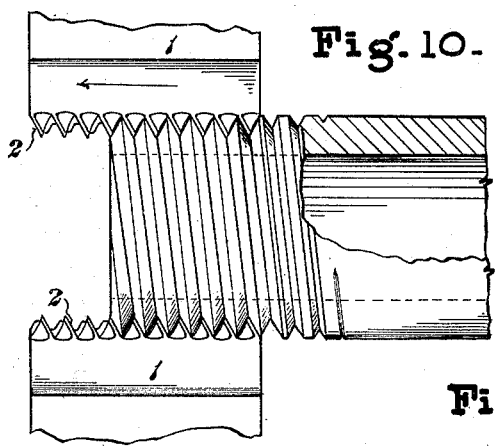
Fig. 10.
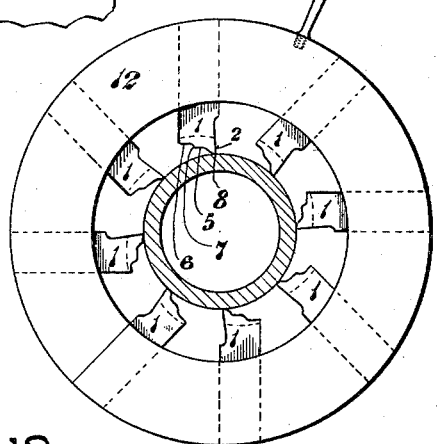
Fig. 11.
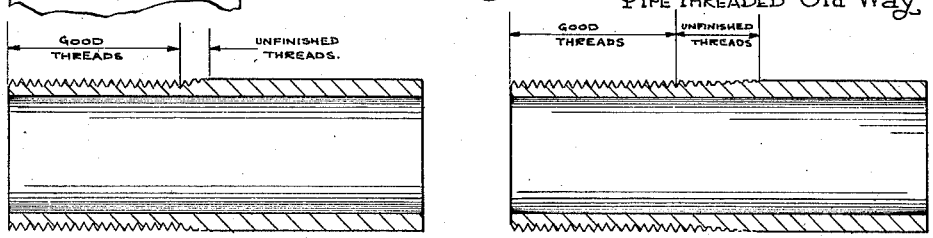
Fig. 12.
Fig. 13.
INVENTOR.
William G. Funk.
BY James N. Ramsey
ATTORNEY.

Patented Apr. 8, 1930

1,754,092

UNITED STATES PATENT OFFICE

WILLIAM G. FUNK, OF COVINGTON, KENTUCKY, ASSIGNOR OF ONE-FOURTH TO STANLEY G. CLARK, OF CINCINNATI, OHIO, AND ONE-FOURTH TO FRANK M. ANDREWS, OF FORT THOMAS, KENTUCKY

THREAD CUTTER

Application filed November 10, 1925. Serial No. 68,204.

My invention relates to tools for cutting threads on tubes, bolts and the like.

The object of my invention is to provide a thread cutting tool of simple construction, which is adapted to easily and conveniently cut the screw threads rapidly, accurately and efficiently, thereby saving much time and expense in the thread cutting operation and producing a neater and more finished product by reducing the number of unfinished threads thereon to a minimum.

My invention consists in providing a plurality of spaced apart and circularly arranged cutter bars each having a series of spaced apart thread cutting teeth on its cutting end to form metal and shaving clearance grooves therebetween and adapted to cut and shave the metal to form the thread producing grooves and to discharge the metal cut and shaved therefrom through said clearance grooves out of the way of the tool as it moves relatively to the object on which the thread is being cut and each alternate cutter bar having its teeth formed to cut one side of the groove and each of the other alternate cutting bars having its cutting teeth formed to cut the other side of the groove whereby all of the cutting teeth are adapted to cut and operate simultaneously on the object having threads formed thereon, thereby producing the threads with great ease, economy and speed and reducing the number of unfinished threads to a minimum.

My invention also consists in the peculiar construction, combination, location and arrangement of parts, as herein set forth and claimed.

In the drawings:

Fig. 1 is a front elevation of one of the cutter bars with one end thereof broken away;

Fig. 2 is a side elevation of the same but showing the full size of the cutter bar;

Fig. 3 is a rear elevation thereof;

Fig. 4 is a perspective view, enlarged, of Fig. 1, showing the cutting edge of the teeth arranged on one side thereof to cut one side of the groove;

Fig. 5 is a view similar to Fig. 4 but showing the cutting edges of the teeth on the other side thereof to cut the other side of the groove;

Fig. 6 is a plan view, enlarged, of Fig. 1;

Fig. 7 is a front elevation of the old style thread-forming tool with the use of which all of the teeth do not operate simultaneously during the entire thread forming operation;

Fig. 8 is a fragmental longitudinal section of the end of a tube and the cutting ends of two of the eight cutter bars, one of which has its teeth formed to cut one side of the groove and the other having its teeth formed to cut the other side of the groove, and which shows the position of a piece of pipe, in section, relative to the thread cutting bars before work is begun, the cutter bars being partly broken away;

Fig. 9 is a similar view after the thread cutting operation has begun;

Fig. 10 is a similar view after the tube is completely threaded;

Fig. 11 is a fragmental view of eight thread cutter bars operatively mounted in the head of a thread cutting machine (not shown) and the positions they assume in relation to the article to be threaded;

Fig. 12 is a central vertical section of an end of pipe threaded with the old style thread forming tool and showing the unfinished threads necessary when making a given number of good threads; and Fig. 13 is a view similar to Fig. 12, the threads being cut with my novel thread cutting bars.

In the embodiment of my invention, as illustrated, and which shows a preferred construction I provide a series of thread cutter bars 1 each having a series of spaced apart cutting teeth 2 arranged transversely on one end thereof with intervening metal and shaving clearance grooves 3 therebetween and with the rear portions 4 of the teeth also reduced at 5 and still further reduced at 6 to provide for greater clearance. The shank or body of each tooth 2 is formed in the shape of a truncated bevel and is off-set at 7. The cutting end of each tooth is beveled to a point 8 and is undercut at 9 to form cutting edge 10 and to provide a shaving clearance recess 11 through which the removed metal is discharged through the clearance grooves 3. Part of the cutter bars have their teeth 2 formed with cutting edges 10 on one side thereof, as shown in Fig. 4, and the remainder of the cutter bars have their cutting edges 10' on the other side thereof, as shown in Fig. 5. The cutter bars, as shown in Fig. 4, are arranged alternately with the other cutter bars in the cutter bar head 12, as shown in Fig. 5 for the reason that the teeth shown in Fig. 4 are adapted to cut one side of the thread forming groove and the teeth shown in Fig. 5 are adapted to cut the metal to form the other side of the thread forming groove, whereby the completion of the removal of the metal is accomplished.

The cutter bars 1 are each provided with guiding lug 13 which is adapted to traverse the usual inwardly converging guide-way (not shown) of cutter head 12 to bring the cutting teeth into cutting action on the object being threaded. These cutter bars are circularly arranged in the cutter bar head with the teeth projecting radially inwardly, as shown in Fig. 11, and in substantially the same manner as with the old style of cutter bars.

Instead of commencing to cut the thread at the end of the tube or bolt by bringing the object to be threaded into gradual engagement with the cutting teeth whereby the teeth are gradually brought into cutting action, as in the old way, all of the teeth of my novel cutter bars are brought into immediate cutting action with the object to be threaded. This effects a great difference and advantage of my invention over such old method because the operation of cutting the threads is several times faster than the old way so that I am enabled to cut the thread in about one-fourth to one-third of the time consumed by the old method. The increased production in a tube mill is about 60%. The only limitation on my cutter bars is that the width of the cutting knives is the distance which threads can be cut on the object to be threaded.

The cutter bars are opened or drawn outwardly and the object to be threaded is placed in position, the end of the object being flush with the outside edge of the bars, as shown in Fig. 8. The cutting bars are then brought down on the object to be threaded. At this point the machine is started and the object starts to turn, or as the head holding the bars starts to turn, whichever the case may be, the bars are brought down gradually, cutting into the object until about three revolutions have been made by which time the cutter bars have cut in the full depth thread, the object being threaded backing out of the cutter bars instead of going forward, as by the old method. When this point has been reached one more complete revolution gives a full depth thread the full length of the threaded part except for the three threads farthest from the end of the object, whereas in the present method six or eight threads will be part depth only. With my invention the finished thread is made in about four to five revolutions, whereas by the old method eighteen revolutions are necessary to cut the same number of threads.

The construction of these thread cutters is such that they cut, rather than push, their way through the metal to be threaded, as in the old way, there being one cuter bar with teeth having cutting edges on the right and the next cutter bar with teeth having cutting edges on the left, and so on, alternately around within the cutter head. This cutting effect of the cutter bars reduces the draught on the machine to a minimum. The teeth on the first cutter bar cuts downwardly and shaves the metal out from one side of the groove, while the teeth on the next following cutter bar cut and shave the metal out of the other side of the groove, and so on, so that in three revolutions the groove is completed to its full depth, thereby leaving a complete and finished thread with only three threads at the inner end unfinished or not cut to their full depth, whereas by the old method six or eight incomplete and unfinished threads are produced. These cutter bars are made for cutting either right hand or left hand threads and can be economically used to great advantage in threading pipes, bolts, etc.

Thus it is seen that by the old method one thread is made at a time with only part of the cutting bars in groove forming operation, whereas with my method all of the cutting teeth of each cutter bar are in cutting action at the same time and during the complete operation from the time the cutting is commenced until the teeth are advanced to the full depth of the thread which they do simultaneously and uniformly.

While I have shown a particular construction and arrangement of parts, it will be understood that some variation in the form of the cutting members may be made without departing from the scope or spirt of the invention as defined in the claims, and the number of cutter bars may be varied as desired.

What I claim as new and desire to secure by Letters Patent is:

1. In thread cutters, a series of cutter bars each having a series of spaced apart cutting teeth on its end with intervening clearance grooves therebetween and arranged transversely of said end, each tooth being recessed or undercut on one side to form a cutting edge and to form a metal clearance whereby the metal shavings cut out of the groove by the cutting edge of each tooth will be readily discharged through said recess and groove, respectively, and a series of alternately arranged cutter bars each having a series of spaced apart cutting teeth on its end with intervening clearance grooves therebetween and arranged transversely of said end, each tooth being recessed or undercut on the other side from said first mentioned teeth to form a cutting edge and to form a metal clearance whereby the metal shavings cut out of the groove by the cutting edge of each tooth will be readily discharged through said recess and groove, respectively, and whereby the entire thread is adapted to be completely cut the full depth simultaneously by said alternately arranged cutting bars, respectively.

2. In thread cutters, a plurality of spaced apart and circularly arranged cutter bars each having a series of spaced apart thread cutting teeth on its cutting end and a metal and shaving clearance groove therebetween and adapted to cut and shave the metal to form the thread producing groove and to discharge the metal cut and shaved therefrom through said clearance grooves out of the way of the tool as it moves relative to the object on which the thread is being cut and each alternate cutting bar having its teeth formed to cut one side of the groove and each of the other alternate cutting bars having its cutting teeth formed to cut the other side of the groove whereby all of the cutting teeth are adapted to cut and operate simultaneously on the object having threads formed thereon.

3. In thread cutters, a cutter bar having a series of cutting teeth arranged transversely on the end thereof with intervening metal clearance grooves therebetween and the shank or body of each tooth formed in the shape of a truncated bevel and increasingly reduced in transverse area from its cutting point to its other end, the cutting end of each tooth being beveled to a point and undercut to form a thread cutting edge and to provide a shaving clearance recess through which the removed metal is discharged therethrough and through the clearance grooves.

WILLIAM G. FUNK.